(12) United States Patent
Jacobson et al.

(10) Patent No.: US 7,382,104 B2
(45) Date of Patent: Jun. 3, 2008

(54) BACKPACK STYLE POWER-PACK WITH FLEXIBLE DRIVE AND QUICK CONNECT POWER TAKE-OFF FOR CONNECTION TO A VARIETY OF POWERED TOOLS

(76) Inventors: Bradley A. Jacobson, 2706 Ivy Dell Ct., Houston, TX (US) 77059; David E. Milton, 110 8th St., San Leon, TX (US) 77539

( * ) Notice: Subject to any disclaimer, the term of this patent is extended or adjusted under 35 U.S.C. 154(b) by 0 days.

(21) Appl. No.: 11/247,393

(22) Filed: Oct. 11, 2005

(65) Prior Publication Data
US 2006/0010850 A1    Jan. 19, 2006

(51) Int. Cl.
*H02P 1/00* (2006.01)
(52) U.S. Cl. .............. 318/276; 318/280; 318/430; 30/276; 30/296.1; 15/330
(58) Field of Classification Search .......... 318/280, 318/283, 430, 432, 276; 56/13.7; 30/276; 15/13.7, 97.1, 330
See application file for complete search history.

(56) References Cited

U.S. PATENT DOCUMENTS

| | | | | |
|---|---|---|---|---|
| 3,219,129 A | * | 11/1965 | Yamada | 173/30 |
| 4,335,585 A | * | 6/1982 | Hoff | 464/52 |
| 4,404,706 A | * | 9/1983 | Loyd | 15/344 |
| 4,451,983 A | * | 6/1984 | Johnson et al. | 30/276 |
| 4,575,356 A | * | 3/1986 | Murohushi et al. | 464/52 |
| 4,884,340 A | * | 12/1989 | Newman | 30/122 |
| 4,989,323 A | * | 2/1991 | Casper et al. | 30/296.1 |
| 5,095,259 A | * | 3/1992 | Bailey et al. | 320/114 |
| 5,289,605 A | * | 3/1994 | Armbruster | 15/97.1 |
| 5,722,111 A | * | 3/1998 | Sowell et al. | 15/330 |
| 5,768,749 A | * | 6/1998 | Ohi et al. | 15/405 |
| 5,802,824 A | * | 9/1998 | Aldrich | 56/13.7 |
| 5,908,339 A | * | 6/1999 | Vassoff | 440/101 |
| 6,032,443 A | * | 3/2000 | Aldrich | 56/13.7 |
| 6,122,830 A | * | 9/2000 | Jarzombek | 30/276 |

* cited by examiner

*Primary Examiner*—Paul Ip
(74) *Attorney, Agent, or Firm*—David W. Alexander (57) ABSTRACT

The present invention relates to portable powered devices or tools for residential, commercial, or industrial applications, in which the power source may be carried on the back of the individual user, power is transferred via a flexible drive shaft, and the powered devices or tools may be quickly connected to or disconnected from the power source via a quick-connect power take-off and power take-on to allow the user to quickly, safely and ergonomically accomplish a variety of tasks, each requiring a different device or tool. Among residential, commercial, or industrial applications, the invention relates to power sources which are lightweight internal combustion engines or AC or DC powered electric motors and to portable powered tools for landscaping, maintenance and repair; such as, without limitation, string-trimmers, edge-trimmers, hedge cutters, brush saws, blowers, drills, buffers, grinders, sanders, drainer cleaners, or sump pumps.

18 Claims, 5 Drawing Sheets

BACKPACK STYLE POWER-PACK WITH FLEXIBLE DRIVE AND QUICK CONNECT POWER TAKE-OFF FOR CONNECTION TO A VARIETY OF POWERED TOOLS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION (1) Field of the Invention

The present invention relates to portable powered devices or tools for residential, commercial, or industrial applications, which may be quickly connected to or disconnected from the power source to allow the user to safely and ergonomically accomplish a variety of tasks, each requiring a different device or tool. In residential applications, the invention relates to portable powered devices for landscaping and home maintenance or repair; such as, without limitation, string-trimmers, edge-trimmers, hedge cutters, blowers, or paint spraying. In commercial settings, the invention relates to portable powered tools for, without limitation, spraying, painting, buffing, sanding, or stripping. In the industrial arena, the invention relates to portable powered tools used for, without limitation, sawing, drilling, grinding, nailing, sanding, or pumping.

More specifically, this invention relates to the field of small internal combustion ("IC") engine-driven and alternating current ("AC") or direct current ("DC") powered electric motor-driven power-packs which may be connected to a variety of power driven tools. The invention further relates to the field of small engine and motor driven power packs which are light enough to be mounted on a backpack frame, outfitted with suitable straps, which allows a user to comfortably carry the powered assembly on the back.

The invention still further relates to the field of small engine and motor driven power packs where the drive shaft of the engine or motor is connected firmly to a rotating flexible drive shaft which is housed within a non-rotating sleeve. The rotating flexible drive shaft is of suitable strength to match the rotational speed, power, and torque of the power unit. The length of the flexible drive shaft and outer sleeve are selected to allow the power from the backpack power unit to be transferred at about waist high and arm's length to the front of the user.

The invention further relates to those powered devices where the end of the rotating flexible drive shaft and outer sleeve opposite the engine or motor connection point terminates at a throttle control arm. The throttle control arm is a light weight tube of suitable material of construction which houses an inner rotating drive shaft.

The invention still further relates to those devices where an engine or motor throttle control arm has mounted on it; a handle, which may be set in a variety of angular positions relative to the line along the length of the control arm, and on-off switch and speed controls for the engine or motor.

The invention further relates to those powered devices where an inner rotating drive shaft extends slightly beyond the end of the tube housing the drive shaft. The outer tube and inner rotating drive shaft terminate at a quick-connect power take off of suitable strength to match the rotational speed, power, and torque of the power unit. The quick-connect power take off allows a user to quickly and safely connect or disconnect to the drive shaft, extending from the throttle control arm, any variety of power tools which have been previously outfitted with a mating quick-connect power take on.

This invention further relates to powered tools which may be outfitted with a quick-connect power take on designed to mate with the quick-connect power take off at the end of a throttle control arm. The powered tools are those tools which may be used for any number of residential, commercial, or industrial applications.

There is a need for a small engine or motor driven power pack; which may be worn on the back of a user, which is connected to a flexible drive shaft allowing the power of the engine or motor to be transferred to the front of the user, and which may be quickly and safely quick-connected to a variety of powered tools. The light weight of the power unit, combined with flexible drive, and quick-connection of power tools allows a user to safely, efficiently, and ergonomically accomplish a wide variety of tasks which require one or more power tools. The present invention satisfies these industry needs, among other demands.

(2) Description of the Related Art Including Information Disclosed Under 37 C.F.R. 1.97 and 1.98

Backpack engine-driven power units and power driven tools are common in the marketplace. Flexible drive shafts with a wide range of length, angular and lateral motion, and speed, power, and torque capability are also well-known. Quick-connect power take-offs have been in existence for many years. A preliminary search by applicants revealed that these individual units are described in a number of patents and patent applications (U.S. Pat. Nos. 4,490,910; 4,823,464; 4,860,451; 5,713,191; 5,979,064; 6,415,585; 6,862,958; 6,895,735; U.S. Pat. Appl. Nos. 20020007559; 20020104896; 20020116825; 20030140884; and 20030221400). However, none of these patents or applications, either alone or in any combination thereof, anticipate the present invention or its various embodiments, nor render the same obvious to one of ordinary skill in this field of endeavor.

Consequently, there is a need for a small engine or motor driven power pack which may be worn on the back of the user and which may be quickly and safely quick-connected to a variety of powered tools via a flexible drive. The light weight of the power unit, combined with a flexible drive shaft, and quick-connection of power tools allows the user to safely, efficiently, and ergonomically accomplish a wide variety of tasks which require one or more power tools. The present invention provides these features and other advancements compared to the prior art.

BRIEF SUMMARY OF THE INVENTION

The present invention is a small IC engine or AC or DC powered electric motor mounted on a backpack which may be worn on the back of an individual user. The engine or motor drive shaft is connected to a flexible drive shaft, housed within a non-rotating sleeve, long enough to be routed from behind to the front of the person wearing the backpack. The free end of the flexible drive shaft is further connected to a throttle control arm—a hollow tube of suitable material of construction which houses a rotating drive shaft.

The throttle control arm has attached to its outer surface an adjustable handle to facilitate the user's positioning of a connected power tool relative to a particular point in space, such as the ground, or an object of work. The outer surface of the throttle control arm has further attached to it an on-off switch and speed control for the engine or motor. The end of the throttle control bar is outfitted with a quick-connect power take off. The quick-connect power take off is designed to permit a variety of power tools, with matching quick-connect power take on, to be connected to the end of the throttle control bar.

The quick-connect power take off attached to the end of the throttle control bar consists of one or more strong connection points around its outer surface. These connection points are designed to mate with the same number of strong points around the outer surface of a quick-connect power take on attached to the end of the powered tool. The quick-connect power take off is designed so that the rotating drive shaft extends sufficiently to allow a power take on to connect with it. This is but one example of a quick-connect power take off and power take on. Other such devices for the quick connection and transfer of power are known to those skills in such arts and would fall within the description here and claims.

The IC engine may be fueled by any appropriate combustible fluid; including, without limitation, alcohol, diesel fuel, gasoline, natural gas, or propane. The engine may be of 2-cycle or 4-cycle design. The electric motor may be powered by a standard AC power cord of sufficient electrical power carrying capability to match the size of the motor. The motor may also be powered by a battery pack of suitable electrical capacity mounted on or adjacent to the backpack. The motor may also be powered by more exotic electrical power sources, including, and without limitation, a fuel-cell or solar panels.

Depending on the power driven tool selected to be used, the user quick-connects the power take on attached to the tool to the power take off on the end of the throttle control bar. After ensuring that the connection is securely fastened, the user adjusts the handle on the throttle control bar based on the type of connected tool and the position of the object of work. The user selects the on position on the on-off switch mounted on the throttle control bar. The user then starts the engine; the electric motor being energized by selecting on. The engine or motor may be outfitted with a centrifugal clutch, well known to those skills in such arts, which allows the engine or motor to run at an idle speed without transferring power to the flexible drive shaft before work is to begin.

When the user is ready to use the power tool for its intended purpose, he activates the engine or motor speed control, thereby increasing its rotational speed. The increasing rotational speed causes power to be transferred to the connected power tool, through the flexible drive shaft and the drive shafts within the throttle control arm and powered tool handle.

The various power tools which may be connected to the quick-connect power take off may comprise; without limitation, string-trimmer, edge-trimmer, branch cutter, brush cutter, wood, metal, or masonry power saw, drills of all diameters and sizes, power ratchet, nail gun, grinder, sander, liquid or powder sprayer, paint roller, pump, blower, floor machines for stripping, sanding, or buffing, or a plumbing snake.

Once the work is completed with the particular connected power tool, the engine or motor may be switched off. After the power unit is switched off, the user may disengage the quick-connect power take on from the quick-connect power take on on the tool. The user may then quick-connect another tool to the quick-connect power take on and begin work again with a different tool.

BRIEF DESCRIPTION OF THE SEVERAL VIEWS OF THE DRAWINGS (1) Drawing Figures

| (2) Reference numerals used in Drawings | |
|---|---|
| 20 | Flex-drive backpack |
| 22 | Gasoline-powered engine |
| 24 | Backpack frame |
| 26 | Straps |
| 28 | Individual User |
| 30 | Flexible drive assembly |
| 32 | Throttle control arm |
| 34 | Adjustable handle |
| 36 | Speed control |

-continued (2) Reference numerals used in Drawings

| | |
|---|---|
| 38 | String-trimmer head |
| 40 | Quick-connect power take off |
| 42 | Quick-connect power take on |
| 44 | Shaft for string trimmer |
| 46 | Knob |
| 48 | On-off switch |
| 50 | Wire |
| 52 | Flexible drive shaft |
| 54 | Flexible drive sleeve |
| 56 | Drive shaft assembly |
| 58 | Engine drive shaft |
| 60 | Housing |
| 62 | Engine drive shaft machining |
| 64 | End plug |
| 66 | Outer sleeve |
| 68 | Set screws |
| 70 | Threaded coupling |
| 72 | Connection point between Item 30 and Item 70 |
| 74 | Connection point between Item 32 and Item 70 |
| 76 | End plug |
| 78 | Shaft |
| 80 | Expanded end of Shaft 78 |
| 82 | End bell |
| 84 | Co-machining point between Item 78 and Item 82 |
| 86 | Co-machining point between Item 82 and Item 88 |
| 88 | Shaft |
| 90 | Bearing |
| 92 | Bearing |
| 94 | Lateral movement stop |
| 96 | Expansion point of Shaft 88 |
| 98 | Shaft |
| 100 | Collar |
| 102 | Through-drilling point in Item 44 and Item 100 |
| 104 | Spring-loaded positioner |
| 106 | Power supply unit |
| 108 | String-trimmer powered tool |
| 110 | Positioning assembly |
| 112 | Hedge-trimmer powered tool |
| 114 | Hedge-trimmer quick-connect power take on |
| 116 | Tube |
| 118 | Hedge-trimmer cutting bar |
| 120 | Edge-trimmer powered tool |
| 122 | Tube |
| 124 | Edge-trimmer cutting head |
| 126 | Chain saw powered tool |
| 128 | Tube |
| 130 | Chain saw cutting chain |
| 132 | Drill powered tool |
| 134 | Tube |
| 136 | Drill bit |
| 138 | Grinder/sander powered tool |
| 140 | Tube |
| 142 | Grinding/sanding head |
| 144 | Plumbing snake powered tool |
| 146 | Tube |
| 148 | Plumbing snake coil |
| 150 | Floor buffer powered tool |
| 152 | Tube |
| 154 | Buffer pad |
| 156 | Sump pump powered tool |
| 158 | Tube |
| 160 | Sump pump |
| 162 | Hose |
| 164 | Blower powered tool |
| 166 | Tube |
| 168 | Blower head |
| 170 | Electric motor |
| 172 | Battery pack |

DETAILED DESCRIPTION OF THE INVENTION

Throughout the specification, certain terms and phrases are defined by the inventors.

"Power take off" means the quick-connect power connection point on the end of the throttle control arm.

"Power take on" means the quick-connect power connection mounted on the drive shaft of the power tool.

"Quick-connect" or "quick-connection" refers to the link between the power take off at the end of throttle control arm and the power take on attached to the power tool.

"Flex-drive backpack" refers to the preferred embodiment of the invention and any modifications thereof; specifically, a backpack style power pack with flexible drive and quick-connect power take off for connection to a variety of powered tools.

(1) Detailed Description of the Preferred Embodiment

The invention described here represents the preferred embodiment. Additional embodiments are also described which depict the invention with other combinations of power supply units and connected power tools.

Figure 1:
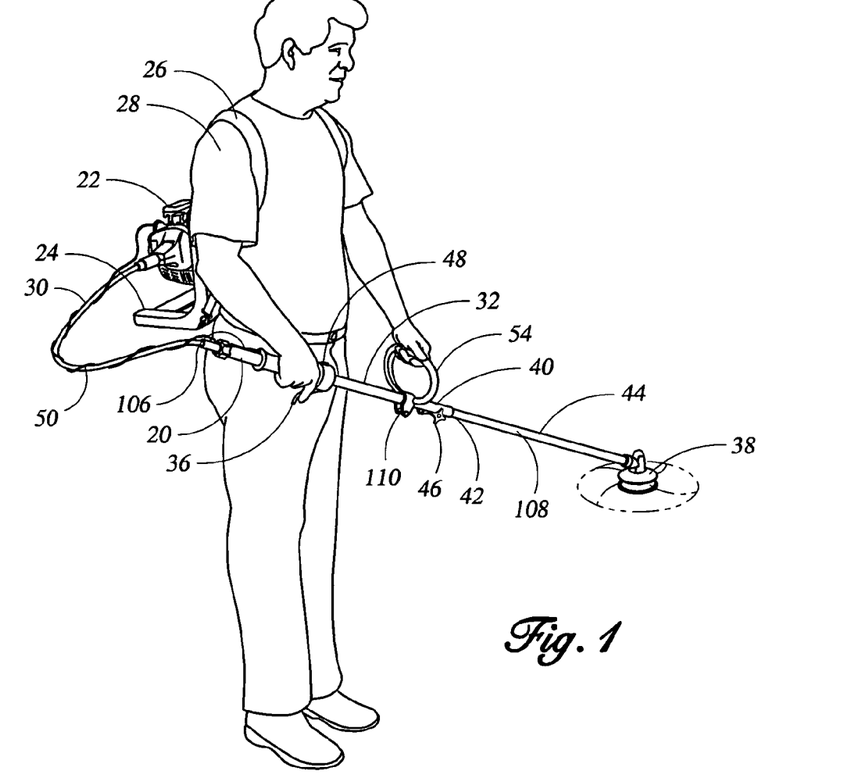
FIG. 1 is a view showing the invention with an IC engine worn by a typical user with the flexible drive connected to a string trimmer.

The flex-drive backpack 20 shown in FIG. 1 comprises, a gasoline-powered engine 22 mounted on backpack frame 24, with straps 26, carried on the back of user 28, with flexible drive assembly 30, throttle control arm 32, with adjustable handle 34, on-off switch 48, and speed control 36, connected to a string-trimmer head 38, the powered tool in the preferred embodiment. On-off control and speed of engine 22 are controlled by on-off switch 48 and speed control 36, respectively, through wire 50.

Quick-connect power take off 40 is attached to the end of throttle control arm 32. Quick-connect power take on 42 is attached to the end of shaft 44, which transfers power from item 42 to string-trimmer head 38. Quick-connect power take off 40 and power take on 42 are secured by knob 46.

Figures 3, 4, 5:
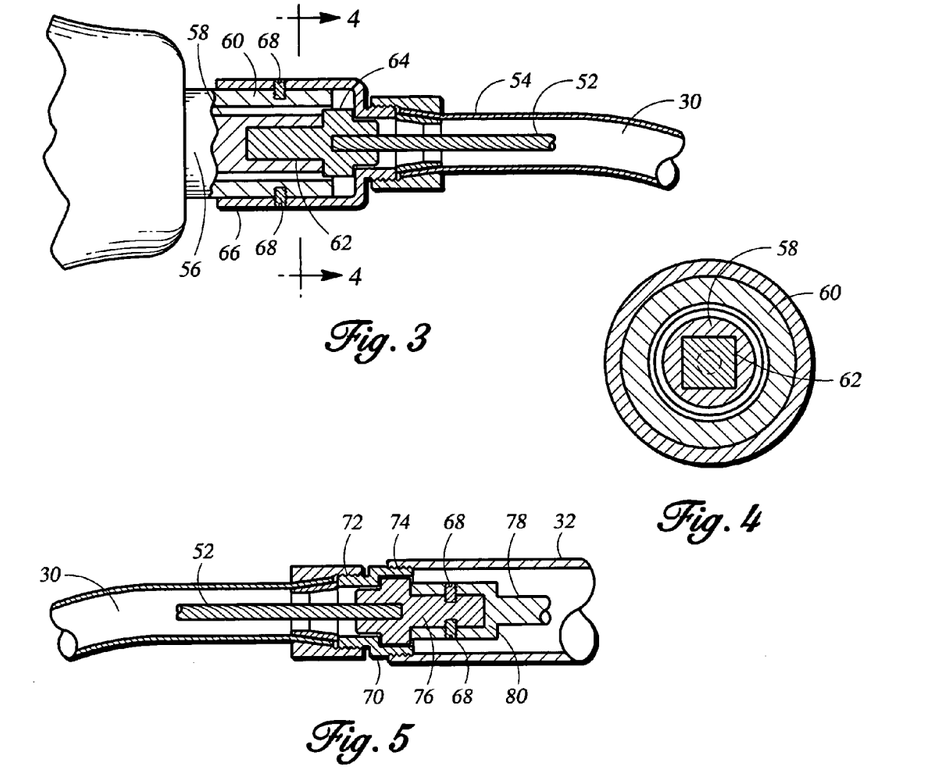
FIG. 3 shows a cross-sectional view of a typical connection between the engine or motor drive shaft and flexible drive shaft.
FIG. 4 is an end view of a typical connection between the engine or motor drive shaft and flexible drive shaft.
FIG. 5 shows a cross-sectional view of a typical connection between the flexible drive shaft and the throttle control arm.

Referring to FIGS. 3 and 4, flexible drive assembly 30 comprises rotating flexible drive shaft 52, which rotates inside flexible, but stationary, sleeve 54. The construction of flexible drive assembly 30 is well known to those skilled in those arts.

Drive shaft assembly 56 of engine 22 comprises engine drive shaft 58, which rotates inside housing 60. Outer sleeve 66 of flexible drive assembly 30 is mounted permanently around the outer surface of housing 60. Outer sleeve 66 is secured to housing 60 using a plurality of set screws 68.

Engine drive shaft 58 is machined at position 62 to permit connection to end plug 64 of flexible drive shaft 52 to allow transfer of power from engine drive shaft 58 to end plug 64 without slippage.

The connection between flexible drive assembly 30 and throttle control arm 32 is depicted in FIG. 5. Flexible drive assembly 30 is connected to throttle control arm 32 via threaded coupling 70. The end of flexible drive assembly 30 is connected to the end of threaded coupling 70 at point 72. Throttle control arm 32 is connected to the opposite end of threaded coupling 70 at point 74. End plug 76 is connected tightly to flexible drive shaft 52. Item 76 is machined to fit inside the expanded end 80 of shaft 78. Item 76 is secured to shaft 78 by a plurality of set screws 68. The connection between flexible drive shaft 52 and shaft 78 is made to permit the transfer of rotational power from 52 to 78 without slippage. Shaft 78 rotates freely inside throttle control arm 32.

Figure 6:
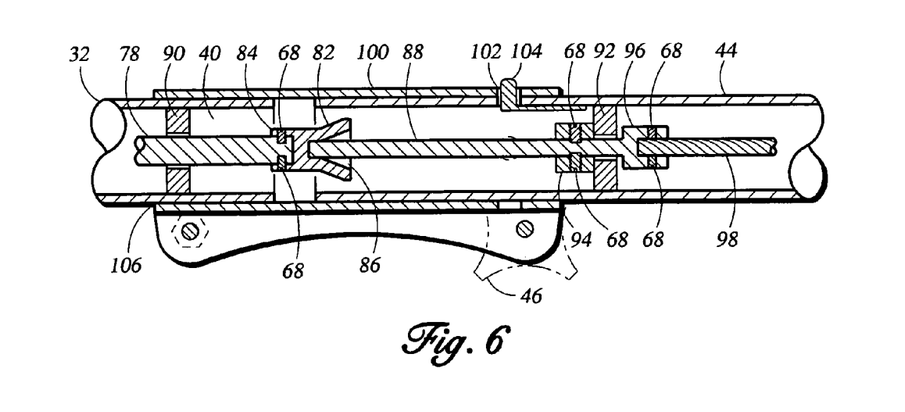
FIG. 6 shows a cross-sectional view of a typical quick-connect connection between the throttle control arm and a powered tool.

The connection between throttle control arm 32 and shaft 44 of a typical power tool is show in FIG. 6. Quick-connect power take off 40 comprises shaft 78 with end bell 82. Shaft 78 rotates within bearing 90, which minimizes the radial movement of 78 while in operation.

Shaft 78 and end bell 82 are co-machined at position 84 so that 82 may be fitted tightly onto shaft 78. Items 78 and 82 are secured by a plurality of set screws 68 which allow the rotational power of shaft 78 to be transmitted to end bell 82 without slippage. Item 82 and shaft 88 are also co-machined at position 86 so that shaft 88 may easily seek a proper fit in 82 while at the same time creating a connection at point 86 which transmits rotational power from 82 to 88 without slippage.

Shaft 88 rotates within bearing 92, which minimizes radial movement of 88 during operation. Shaft 88 has a lateral movement stop 94 secured to by a plurality of set screws 68. Item 94 prevents the lateral movement of shaft 88 away from end bell 82. Item 94 is constructed of a material which can rotate with minimal friction against Item 92.

Shaft 88 is expanded at point 96 to accept shaft 98. Shaft 98 rotates within tube 44 and transmit rotational energy to the power tool. Shaft 88 is secured to shaft 98 by a plurality of set screws 68 so that rotational power of 88 may be transferred to 98 without slippage.

As depicted in FIG. 6, the outside diameter of throttle control arm 32 and tube 44 are approximately the same. Item 32 is fitted with collar 100 for a portion of its length. Collar 100 is joined to the outside surface of throttle control arm 32 at position 106. Collar 100 extends beyond the end of throttle control arm 32 sufficiently to support tube 44 when it is inserted into collar 100.

As further shown in FIG. 6, tube 44 and collar 100 are through drilled at position 102. The inside of tube 44 is fitted with spring loaded positioner 104. The assembly of throttle control arm 32 with attached collar 100, and end bell 82 connected to shaft 78 forms quick-connect power take off 40. Tube 44, fitted with shaft 88 and spring loaded positioner 104 form quick-connect power take on 42.

The quick-connection between quick-connect power take on 40 and quick-connect power take off 42 is formed by; first loosening knob 46, then inserting tube 44 into position within collar 100 while allowing shaft 88 is properly fit into end bell 82, then rotating 44 within 100 until spring loaded positioner 104 emerges through hole 102, and finally hand tightening knob 46 to secure collar 100 around shaft 44.

Figure 7A:
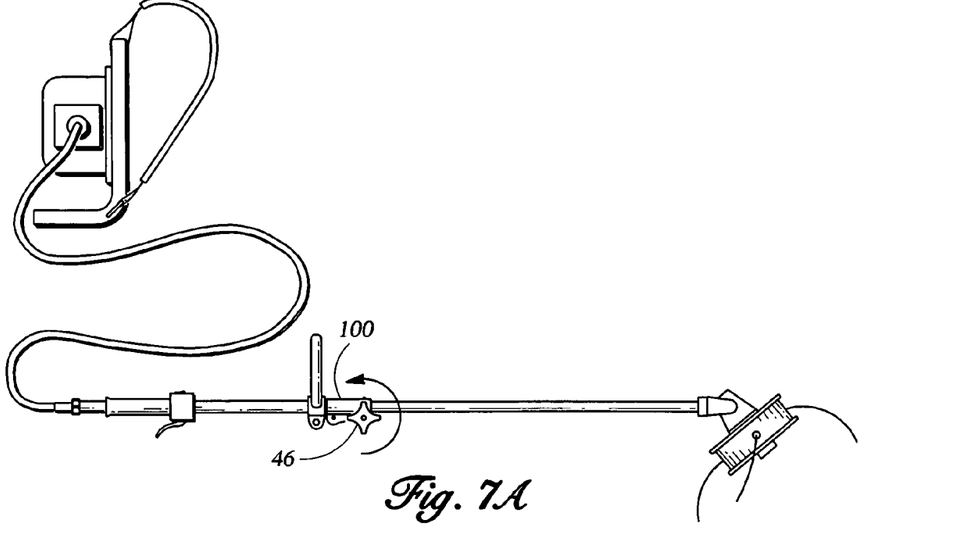
FIG. 7A depicts the backpack power unit and flexible drive shaft with a string-trimmer power tool connected to the throttle control arm.

FIG. 7A shows the preferred embodiment in preparation for removal of the string-trimmer powered tool. To remove the string-trimmer tool, knob 46 is loosened by turning counter-clockwise. This frees collar 100.

Figure 7B:
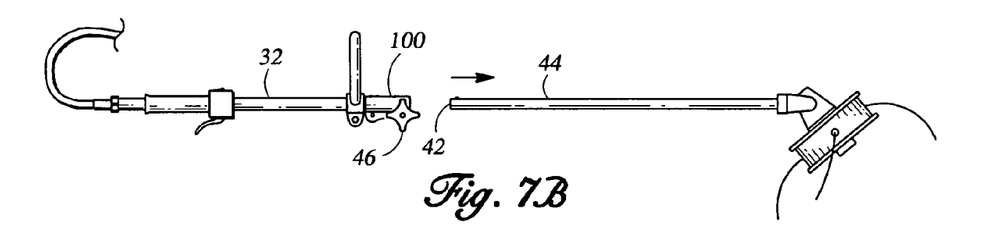
FIG. 7B shows the throttle control arm just disconnected from a string-trimmer power tool.

FIG. 7B shows the preferred embodiment shortly after knob 46 has been loosened and tube 44 has been removed from collar 100.

Operation of the preferred and alternate embodiments may be envisioned by referring to FIG. 1. User 28 prepares flex-drive backpack 20 for operation by connecting power supply unit 106 to string trimmer powered tool 108 at power take off 40 and power take on 42 and securing 106 to 108 by tightening knob 46. The position of handle 34 is adjusted using positioning assembly 110 to suit the user's ergonomic preferences and the object of work.

User 28 switches on-off switch 48 to the on position and starts engine 22 by any number of engine starting means well known to those skilled in the art. User 28 places backpack 24 over the shoulders and adjusts straps 26 for comfort. User 28 grasps throttle control bar 32 and handle 34 and positions string trimmer head 38 adjacent to the desired work area. User 28 then squeezes speed control 36 which causes the rotational speed of engine 22 to increase. The rotational power of item 22 is transferred through flex drive assembly 30, throttle control arm 32, power take off 40, power take on 42, and tube 44, to string trimmer head 38.

Flex-drive assembly 30 allows the user 28 is move throttle control arm 32 and string trimmer head 38 to any desired position relative to the object of work independently of his own position. This feature permits user 28 to perform his desired task with optimal ergonomic position and least stress on the upper torso, back, and legs.

Referring to FIG. 1, once the work is done, user 28 switches off engine 22 by selecting the off position of switch 48. User 28 then loosens straps 26 and removes backpack frame 24.

Further referring to FIG. 7A, if work is intended using a different powered tool, user 28 loosens knob 46 by rotating it counter-clockwise. This loosens collar 100 which unclasps quick-connect power take off 40 from power take on 42.

Looking at FIG. 4B, once released, user 28 pulls shaft 44 away from throttle control arm 32 which disengages quick-connect power take off 40 from quick-connect power take on 42.

(2) Detailed Description of the First Alternative Embodiment

Figure 8A:
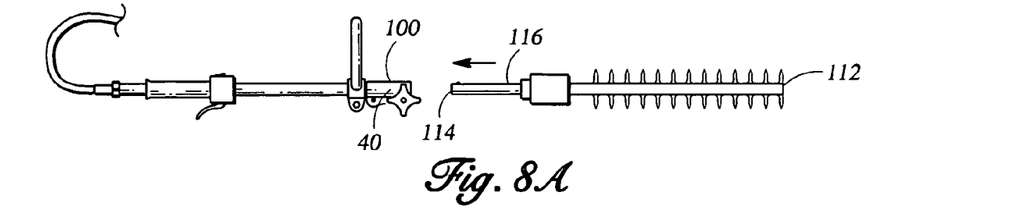
FIG. 8A illustrates the throttle control arm ready to be quick-connected to a hedge-trimmer power tool.

The First Alternative Embodiment is depicted in FIG. 8A. If user 28 desires to trim hedges, he takes hedge trimmer powered tool 112 in hand and engages quick-connect power take off 40 and hedge trimmer quick-connect power take on 114 by sliding tube 116 into collar 100.

Figure 8B:
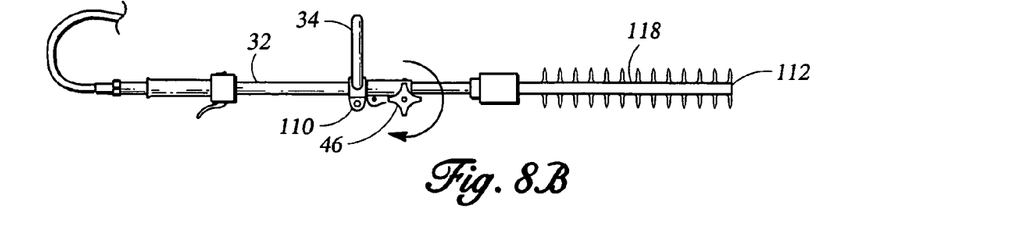
FIG. 8B represents the throttle control arm quick-connected to a hedge-trimmer power tool.

As viewed in FIG. 8B, Item 112 is secured to throttle control arm 32 by rotating knob 46 clockwise until collar 100 is snug against tube 116. User 28 adjusts handle 34 to an appropriate position to suit operation of powered tool 112 using handle positioning assembly 110.

Referring to FIGS. 1, 8A, and 8B, user 28 switches on-off switch 48 to the on position and starts engine 22 by any number of means well known to those skilled in the art. User 28 places backpack 24 over the shoulders and adjusts straps 26 for comfort. User 28 grasps throttle control bar 32 and handle 34 and positions hedge trimmer cutting bar 118 adjacent to the desired work area. User 28 then squeezes speed control 36 which causes the rotational speed of engine 22 to increase. The rotational power of item 22 is transferred through flex drive assembly 30, throttle control arm 32, power take off 40, power take on 114, and tube 116, to hedge trimmer cutting bar 118.

(3) Detailed Description of the Second Alternative Embodiment

Figure 9:
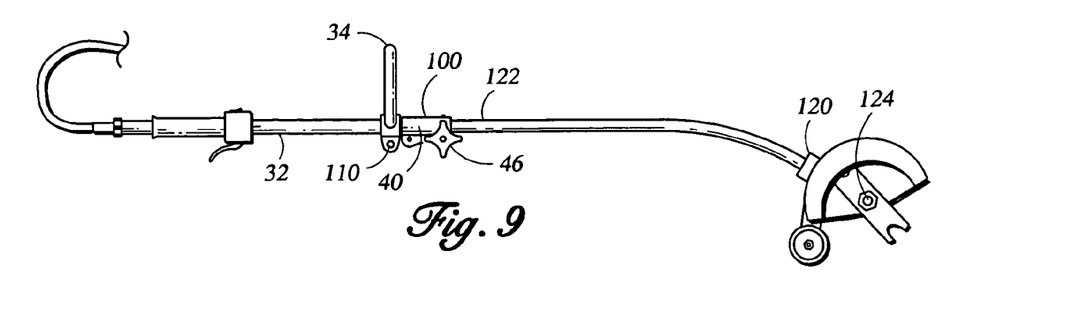
FIG. 9 depicts the throttle control arm quick-connected to an edge-trimmer power tool.

The Second Alternative Embodiment is depicted in FIG. 9. If user 28 desires to edge trim, he connects edge trimmer powered tool 120 to throttle control arm 32 by rotating knob 46 counterclockwise enough to loosen collar 100 to allow tube 122 to slip inside Item 100. Once in position, knob 46 is rotated clockwise to tighten collar 100 around tube 122. User 28 adjusts handle 34 to an appropriate position to suit operation of powered tool 120 using handle positioning assembly 110.

Referring to FIGS. 1 and 9, user 28 switches on-off switch 48 to the on position and starts engine 22 by any number of means well known to those skilled in the art. User 28 places backpack 24 over the shoulders and adjusts straps 26 for comfort. User 28 grasps throttle control bar 32 and handle 34 and positions edge trimmer cutting head 124 adjacent to the desired work area. User 28 then squeezes speed control 36 which causes the rotational speed of engine 22 to increase. The rotational power of item 22 is transferred through flex drive assembly 30, throttle control arm 32, power take off 40, and tube 122, to hedge trimmer cutting head 124.

(4) Detailed Description of the Third Alternative Embodiment

Figure 10:
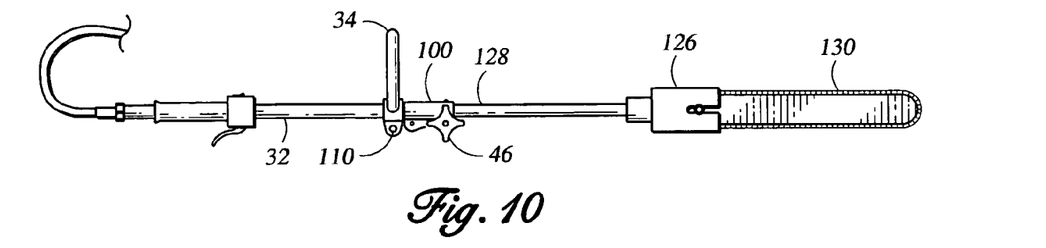
FIG. 10 shows the throttle control arm quick-connected to a chain saw power tool.

The Third Alternative Embodiment is depicted in FIG. 10. If user 28 desires to cut branches with a chain saw, she connects chain saw powered tool 126 to throttle control arm 32 by rotating knob 46 counterclockwise enough to loosen collar 100 to allow tube 128 to slip inside Item 100. Once in position, knob 46 is rotated clockwise to tighten collar 100 around tube 128. User 28 adjusts handle 34 to an appropriate position to suit operation of powered tool 126 using handle positioning assembly 110.

Referring to FIGS. 1 and 10, user 28 switches on-off switch 48 to the on position and starts engine 22 by any number of means well known to those skilled in the art. User 28 places backpack 24 over the shoulders and adjusts straps 26 for comfort. User 28 grasps throttle control bar 32 and handle 34 and positions chain saw cutting chain 130 adjacent to the desired work area. User 28 then squeezes speed control 36 which causes the rotational speed of engine 22 to increase. The rotational power of item 22 is transferred through flex drive assembly 30, throttle control arm 32, power take off 40, and tube 128, to chain saw cutting chain 130.

(5) Detailed Description of the Fourth Alternative Embodiment

Figure 11:
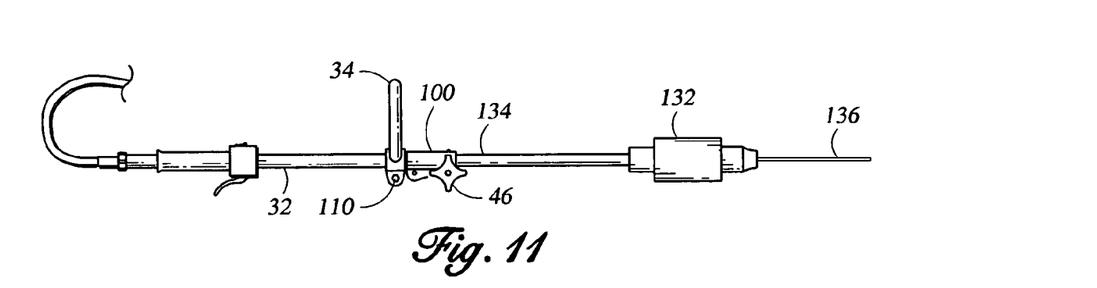
FIG. 11 illustrates the throttle control arm quick-connected to a drill power tool.

The Fourth Alternative Embodiment is depicted in FIG. 11. If user 28 desires to drill, he connects drill powered tool 132 to throttle control arm 32 by rotating knob 46 counterclockwise enough to loosen collar 100 to allow tube 134 to slip inside Item 100. Once in position, knob 46 is rotated clockwise to tighten collar 100 around tube 134. User 28 adjusts handle 34 to an appropriate position to suit operation of powered tool 132 using handle positioning assembly 110.

Referring to FIGS. 1 and 11, user 28 switches on-off switch 48 to the on position and starts engine 22 by any number of means well known to those skilled in the art. User 28 places backpack 24 over the shoulders and adjusts straps 26 for comfort. User 28 grasps throttle control bar 32 and handle 34 and positions drill bit 136 adjacent to the desired work area. User 28 then squeezes speed control 36 which causes the rotational speed of engine 22 to increase. The rotational power of item 22 is transferred through flex drive assembly 30, throttle control arm 32, power take off 40, and tube 134, to drill bit 136.

(6) Detailed Description of the Fifth Alternative Embodiment

Figure 12:
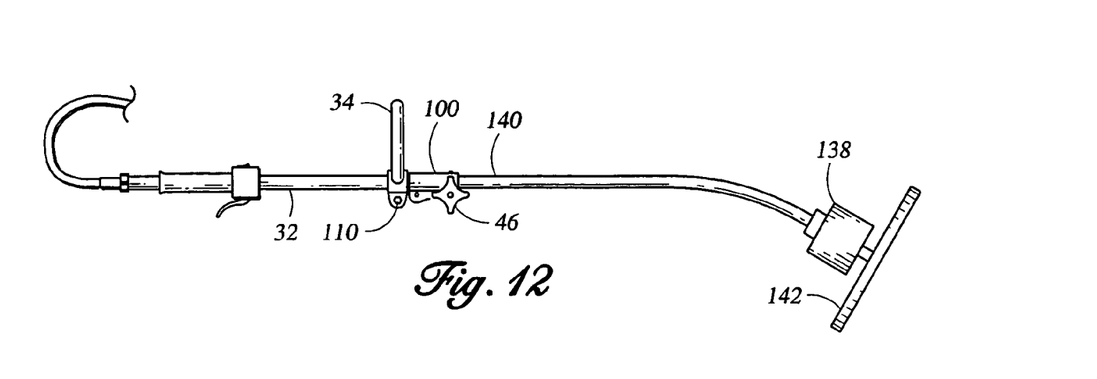
FIG. 12 represents the throttle control arm quick-connected to a grinder/sander power tool.

The Fifth Alternative Embodiment is depicted in FIG. 12. If user 28 desires to grind or sand and object, she connects grinder/sander powered tool 138 to throttle control arm 32 by rotating knob 46 counterclockwise enough to loosen collar 100 to allow tube 140 to slip inside Item 100. Once in position, knob 46 is rotated clockwise to tighten collar 100 around tube 140. User 28 adjusts handle 34 to an appropriate position to suit operation of powered tool 138 using handle positioning assembly 110.

Referring to FIGS. 1 and 12, user 28 switches on-off switch 48 to the on position and starts engine 22 by any number of means well known to those skilled in the art. User 28 places backpack 24 over the shoulders and adjusts straps 26 for comfort. User 28 grasps throttle control bar 32 and handle 34 and positions grinding/sanding head 142 adjacent to the desired work area. User 28 then squeezes speed control 36 which causes the rotational speed of engine 22 to increase. The rotational power of item 22 is transferred through flex drive assembly 30, throttle control arm 32, power take off 40, and tube 140, to grinding/sanding head 142.

(7) Detailed Description of the Sixth Alternative Embodiment

Figure 13:
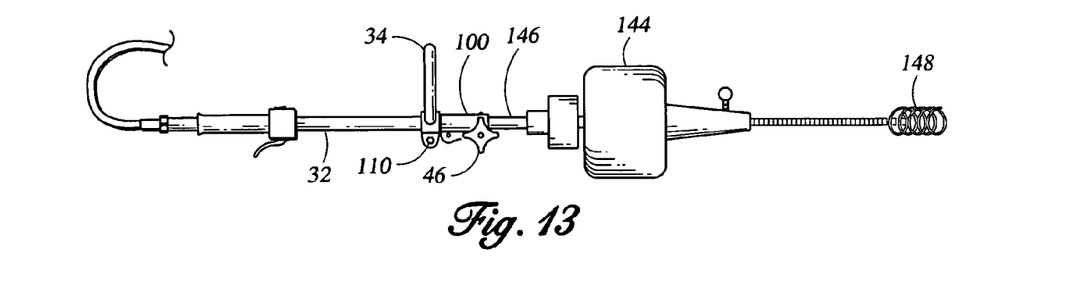
FIG. 13 depicts the throttle control arm quick-connected to a plumbing snake power tool.

The Sixth Alternative Embodiment is depicted in FIG. 13. If user 28 desires to unplug a drain pipe, he connects plumbing snake powered tool 144 to throttle control arm 32 by rotating knob 46 counterclockwise enough to loosen collar 100 to allow tube 146 to slip inside Item 100. Once in position, knob 46 is rotated clockwise to tighten collar 100 around tube 146. User 28 adjusts handle 34 to an appropriate position to suit operation of powered tool 144 using handle positioning assembly 110.

Referring to FIGS. 1 and 13, user 28 switches on-off switch 48 to the on position and starts engine 22 by any number of means well known to those skilled in the art. User 28 places backpack 24 over the shoulders and adjusts straps 26 for comfort. User 28 grasps throttle control bar 32 and handle 34 and positions plumbing snake coil 148 adjacent to the desired work area. User 28 then squeezes speed control 36 which causes the rotational speed of engine 22 to increase. The rotational power of item 22 is transferred through flex drive assembly 30, throttle control arm 32, power take off 40, and tube 146, to plumbing snake coil 148.

(8) Detailed Description of the Seventh Alternative Embodiment

Figure 14:
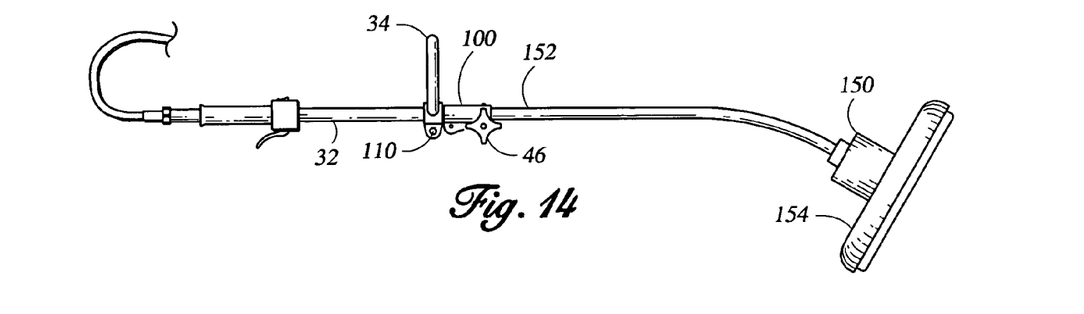
FIG. 14 shows the throttle control arm quick-connected to a floor buffer power tool.

The Seventh Alternative Embodiment is depicted in FIG. 14. If user 28 desires to buff a floor, she connects floor buffer powered tool 150 to throttle control arm 32 by rotating knob 46 counterclockwise enough to loosen collar 100 to allow tube 152 to slip inside Item 100. Once in position, knob 46 is rotated clockwise to tighten collar 100 around tube 152. User 28 adjusts handle 34 to an appropriate position to suit operation of powered tool 150 using handle positioning assembly 110.

Referring to FIGS. 1 and 14, user 28 switches on-off switch 48 to the on position and starts engine 22 by any number of means well known to those skilled in the art. User 28 places backpack 24 over the shoulders and adjusts straps 26 for comfort. User 28 grasps throttle control bar 32 and handle 34 and positions buffer pad 154 adjacent to the desired work area. User 28 then squeezes speed control 36 which causes the rotational speed of engine 22 to increase. The rotational power of item 22 is transferred through flex drive assembly 30, throttle control arm 32, power take off 40, and tube 152, to buffer pad 154.

(9) Detailed Description of the Eighth Alternative Embodiment

Figure 15:
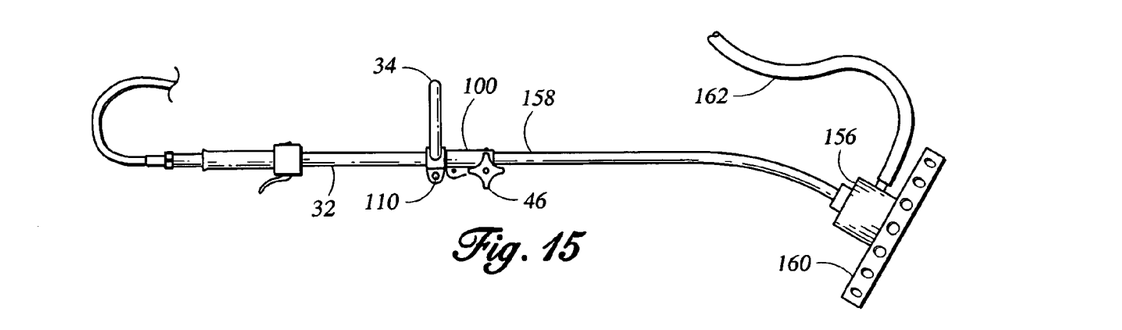
FIG. 15 illustrates the throttle control arm quick-connected to a sump pump power tool.

The Eighth Alternative Embodiment is depicted in FIG. 15. If user 28 desires to pump out a sump which contains a pumpable liquid, he connects sump pump powered tool 156 to throttle control arm 32 by rotating knob 46 counterclockwise enough to loosen collar 100 to allow tube 158 to slip inside Item 100. Once in position, knob 46 is rotated clockwise to tighten collar 100 around tube 158. User 28 adjusts handle 34 to an appropriate position to suit operation of powered tool 156 using handle positioning assembly 110.

Referring to FIGS. 1 and 15, user 28 switches on-off switch 48 to the on position and starts engine 22 by any number of means well known to those skilled in the art. User 28 places backpack 24 over the shoulders and adjusts straps 26 for comfort. User 28 grasps throttle control bar 32 and handle 34 and positions sump pump 160 into the liquid to be pumped. User 28 positions hose 162 to direct the pumped liquid to the desired location. User 28 then squeezes speed control 36 which causes the rotational speed of engine 22 to increase. The rotational power of item 22 is transferred through flex drive assembly 30, throttle control arm 32, power take off 40, and tube 158, to sump pump 160.

(10) Detailed Description of the Ninth Alternative Embodiment

Figure 16:
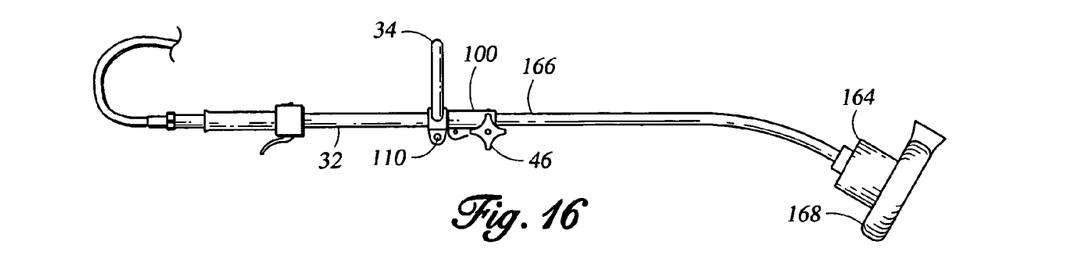
FIG. 16 represents the throttle control arm quick-connected to a blower power tool.

The Ninth Alternative Embodiment is depicted in FIG. 16. If user 28 desires to use the invention as a blower, she connects blower powered tool 164 to throttle control arm 32 by rotating knob 46 counterclockwise enough to loosen collar 100 to allow tube 166 to slip inside Item 100. Once in position, knob 46 is rotated clockwise to tighten collar 100 around tube 166. User 28 adjusts handle 34 to an appropriate position to suit operation of powered tool 164 using handle positioning assembly 110.

Referring to FIGS. 1 and 16, user 28 switches on-off switch 48 to the on position and starts engine 22 by any number of means well known to those skilled in the art. User 28 places backpack 24 over the shoulders and adjusts straps 26 for comfort. User 28 grasps throttle control bar 32 and handle 34 and positions blower head 168 adjacent to the desired work area. User 28 then squeezes speed control 36 which causes the rotational speed of engine 22 to increase. The rotational power of item 22 is transferred through flex drive assembly 30, throttle control arm 32, power take off 40, and tube 166, to blower head 168.

(11) Detailed Description of the Tenth Alternative Embodiment

Figure 2:
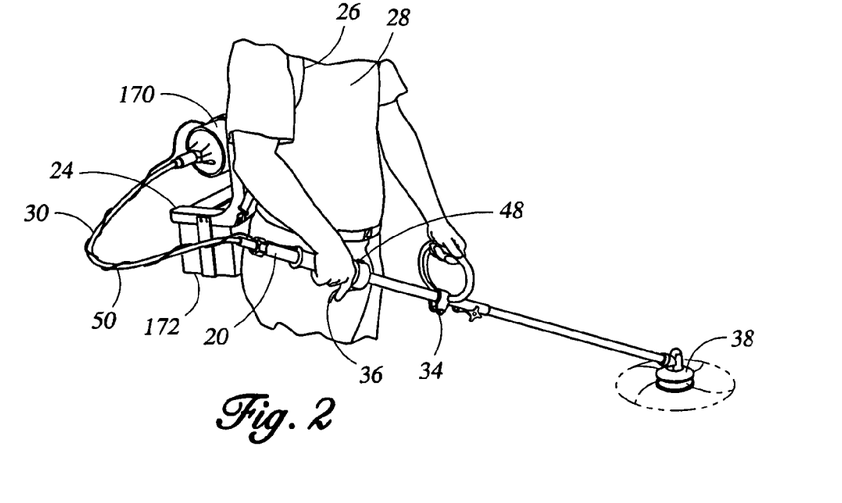
FIG. 2 is a view showing the invention with a battery-powered DC motor worn by a typical user with the flexible drive connected to a string trimmer.

The Tenth Alternative Embodiment is depicted in FIG. 2. In this embodiment, the flex-drive backpack 20 shown in FIGS. 1 and 2 comprises, a electric motor 170, with battery pack 172, mounted on backpack frame 24, with straps 26, carried on the back of user 28, with flexible drive assembly 30, throttle control arm 32, with adjustable handle 34, on-off switch 48, and speed control 36, connected to a string-trimmer head 38, the powered tool in the preferred embodiment. On-off control and speed of motor 170 are controlled by on-off switch 48 and speed control 36, respectively, through wire 50.

(12) The Invention is Not Limited to the Embodiments Described Above

It is to be understood that the flexible drive back pack may be utilized with any number of powered tools and power supply units other than those described above. Accordingly, while only the preferred embodiment of the invention and specific modifications thereto have been described herein in detail, the invention is not limited thereby, and other modifications can be made within the scope of the attached claims.

We claim:

1. A backpack style power-pack with flexible drive and quick-connect power take-off for connection to a variety of powered tools, each of said powered tools outfitted with a quick-connect power take-on, comprising:
   (a) a power supply means;
   (b) a portable, lightweight and rigid carrying means for said power supply means;
   (c) a flexible power transfer means connected to the power supply means;
   (d) an on-off switching means for the power supply means;
   (e) a power speed control means for the power supply means;
   (f) a powered tool positioning means;
   (g) a light-weight and rigid mounting means for supporting said on-off switching means, said power speed control means, and said powered tool positioning means, and whereby the end of said flexible power transfer means opposite the end connected to the power supply means is connected to the end of said light-weight and rigid mounting means;
   (h) a quick-connect power take-off means, whereby said quick-connect power take-off means is connected to the end of the light-weight and rigid mounting means opposite the end where the flexible power transfer means is connected;
   (i) a powered tool means;
   (j) a quick-connect power take on means connected to said powered tool means; and
   (k) a connecting means for joining said quick-connect power take on means and said quick-connect power take-off means, whereby the quick-connect power take on means and the quick-connect power take off means are joined to form a rigid assembly.

2. A backpack style power-pack with flexible drive and quick-connect power take-off for connection to a variety of powered tools, each of said powered tools outfitted with a quick-connect power take on as in claim 1, where in;
   (a) said power supply means is an internal combustion engine, with fuel supply, small and light enough to be worn on the back of a user;
   (b) said portable, lightweight and rigid carrying means is a back pack with straps which may be comfortably worn on the back of said user;
   (c) said flexible power transfer means is a flexible drive shaft securely connected to the drive shaft of said internal combustion engine, whereby rotational power from the internal combustion engine may be transferred to said flexible drive shaft without slippage;
   (d) said on-off switching means for the internal combustion engine is an on-off power switch;
   (e) said power speed control means for the internal combustion engine is a spring-loaded speed control switch; whereby the rotational speed of the internal combustion engine may be varied from idle speed to full speed;
   (f) said powered tool positioning means is a handle which may be adjusted to the user's preference and grasped by the user;
   (g) said light-weight and rigid mounting means is a metal or plastic tube upon which is mounted said on-off power switch, said spring-loaded speed control switch, and said handle which may be adjusted to the user's preference and grasped by the user, and to which is connected the flexible drive shaft;

(h) said quick-connect power take-off means is a quick-connect power take-off connected to the end of said metal or plastic tube at the end opposite the end where the flexible drive shaft is connected to the metal or plastic tube;

(i) said powered tool means is any one of a variety of tools, comprising a string trimmer, a hedge trimmer, an edge trimmer, a chain saw, a drill, a grinder/sander, a plumbing snake, a floor buffer, a sump pump, or blower;

(j) said quick-connect power take on means is a quick-connect power take on connected to each of a variety of tools, comprising said string trimmer, said hedge trimmer, said edge trimmer, said chain saw, said drill, said grinder/sander, said plumbing snake, said floor buffer, said sump pump, or said blower; and (k) said connecting means for joining said quick-connect power take-off connected to the end of said metal or plastic tube and quick-connect power take on connected to each of a variety of tools, comprising the string trimmer, the hedge trimmer, the edge trimmer, the chain saw, the drill, the grinder/sander, the plumbing snake, the floor buffer, the sump pump, or the blower, is a collar and knob.

3. A backpack style power-pack with flexible drive and quick-connect power take-off for connection to a variety of powered tools, each of said powered tools outfitted with a quick-connect power take-on as in claim 1, where in;

(a) said power supply means is an electric motor powered by a battery pack.

4. A backpack style power-pack with flexible drive and quick-connect power take-off for connection to a variety of powered tools, each of said powered tools outfitted with a quick-connect power take-on as in claim 1, where in;

(a) said power supply means is an electric motor powered by a fuel-cell.

5. A backpack style power-pack with flexible drive and quick-connect power take-off for connection to a variety of powered tools, each of said powered tools outfitted with a quick-connect power take-on as in claim 1, where in;

(a) said power supply means is an electric motor powered by a solar panel.

6. A backpack style power-pack with flexible drive and quick-connect power take-off for connection to a variety of powered tools, each powered tool outfitted with a quick-connect power take-on as in claim 1, where in;

(a) said power supply means is an electric motor powered by a power cord.

7. A backpack style power-pack with flexible drive and quick-connect power take-off for connection to a variety of powered tools, each of said powered tools outfitted with a quick-connect power take-on as in claim 1, where in;

(a) said power supply means is an internal combustion engine fueled by any appropriate combustible fluid; including, without limitation, alcohol, diesel fuel, gasoline, natural gas, or propane.

8. A backpack style power-pack with flexible drive and quick-connect power take-off for connection to a variety of powered tools, each of said powered tools outfitted with a quick-connect power take-on as in claim 1, where in;

(a) said power supply means is an internal combustion engine of 4-cycle design.

9. A backpack style power-pack with flexible drive and quick-connect power take-off for connection to a variety of powered tools, each of said powered tools outfitted with a quick-connect power take-on as in claim 1, where in;

(a) said power supply means is an internal combustion engine of 2-cycle design.

10. A method for providing portable power, with flexible drive and quick-connect power take-off, to a variety of powered tools, each of said powered tools outfitted with a quick-connect power take-on, comprising the steps of:

(a) providing a power supply means;

(b) mounting said power supply means on a portable, lightweight and rigid carrying means;

(c) joining a flexible power transfer means to the power supply means;

(d) providing an on-off switching means for the power supply means;

(e) furnishing a power speed control means for the power supply means;

(f) providing a powered tool positioning means;

(g) furnishing a light-weight and rigid mounting means for supporting said on-off switching means, said power speed control means, and said powered tool positioning means;

(h) joining the end of said flexible power transfer means opposite the end connected to the power supply means to the end of said light-weight and rigid mounting means;

(i) connecting a quick-connect power take-off means to the end of the light-weight and rigid mounting means opposite the end where the flexible power transfer means is connected;

(j) furnishing a powered tool means;

(k) connecting a quick-connect power take on means to said powered tool means; and (l) providing a connecting means for joining said quick-connect power take on means and said quick-connect power take-off means, whereby the quick-connect power take on means and the quick-connect power take off means are joined to form a rigid assembly.

11. A method for providing portable power, with flexible drive and quick-connect power take-off, to a variety of powered tools, each of said powered tools outfitted with a quick-connect power take-on as in claim 10, where in:

(a) said power supply means is an internal combustion engine, with fuel supply, small and light enough to be worn on the back of a user;

(b) said portable, lightweight and rigid carrying means is a back pack with straps which may be comfortably worn on the back of said user;

(c) said flexible power transfer means is a flexible drive shaft securely connected to the drive shaft of said internal combustion engine, whereby rotational power from the internal combustion engine may be transferred to said flexible drive shaft without slippage;

(d) said on-off switching means for the internal combustion engine is an on-off power switch;

(e) said power speed control means for the internal combustion engine is a spring-loaded speed control switch; whereby the rotational speed of the internal combustion engine may be varied from idle speed to full speed;

(f) said powered tool positioning means is a handle which may be adjusted to the user's preference and grasped by the user;

(g) said light-weight and rigid mounting means is a metal or plastic tube upon which is mounted said on-off power switch, said spring-loaded speed control switch, and said handle which may be adjusted to the user's preference and grasped by the user, and to which is connected the flexible drive shaft;

(h) said quick-connect power take-off means is a quick-connect power take-off connected to the end of said metal or plastic tube at the end opposite the end where the flexible drive shaft is connected to the metal or plastic tube;
(i) said powered tool means is any one of a variety of tools, comprising a string trimmer, a hedge trimmer, an edge trimmer, a chain saw, a drill, a grinder/sander, a plumbing snake, a floor buffer, a sump pump, or blower;
(j) said quick-connect power take on means is a quick-connect power take on connected to each of a variety of tools, comprising said string trimmer, said hedge trimmer, said edge trimmer, said chain saw, said drill, said grinder/sander, said plumbing snake, said floor buffer, said sump pump, or said blower; and
(k) said connecting means for joining said quick-connect power take-off connected to the end of said metal or plastic tube and quick-connect power take on connected to each of a variety of tools, comprising the string trimmer, the hedge trimmer, the edge trimmer, the chain saw, the drill, the grinder/sander, the plumbing snake, the floor buffer, the sump pump, or the blower, is a collar and knob.

12. A method for providing portable power, with flexible drive and quick-connect power take-off, to a variety of powered tools, each of said powered tools outfitted with a quick-connect power take-on as in claim 10, where in:
   (a) said power supply means is an electric motor powered by a battery pack.

13. A method for providing portable power, with flexible drive and quick-connect power take-off, to a variety of powered tools, each of said powered tools outfitted with a quick-connect power take-on as in claim 10, where in:
   (a) said power supply means is an electric motor powered by a fuel cell.

14. A method for providing portable power, with flexible drive and quick-connect power take-off, to a variety of powered tools, each of said powered tools outfitted with a quick-connect power take-on as in claim 10, where in:
   (a) said power supply means is an electric motor powered by a solar panel.

15. A method for providing portable power, with flexible drive and quick-connect power take-off, to a variety of powered tools, each of said powered tools outfitted with a quick-connect power take-on as in claim 10, where in:
   (a) said power supply means is an electric motor powered by a power cord.

16. A method for providing portable power, with flexible drive and quick-connect power take-off, to a variety of powered tools, each of said powered tools outfitted with a quick-connect power take-on as in claim 10, where in:
   (a) said power supply means is an internal combustion engine fueled by any appropriate combustible fluid; including, without limitation, alcohol, diesel fuel, gasoline, natural gas, or propane.

17. A method for providing portable power, with flexible drive and quick-connect power take-off, to a variety of powered tools, each of said powered tools outfitted with a quick-connect power take-on as in claim 10, where in:
   (a) said power supply means is an internal combustion engine of 4-cycle design.

18. A method for providing portable power, with flexible drive and quick-connect power take-off, to a variety of powered tools, each of said powered tools outfitted with a quick-connect power take-on as in claim 10, where in:
   (a) said power supply means is an internal combustion engine of 2-cycle design.

* * * * *